US006617831B2

(12) United States Patent
Perol

(10) Patent No.: US 6,617,831 B2
(45) Date of Patent: Sep. 9, 2003

(54) ELECTRICAL POWER SUPPLY CONVERTER

(75) Inventor: Philippe Alfred Perol, Den Haag (NL)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 10/125,487

(22) Filed: Apr. 19, 2002

(65) Prior Publication Data
US 2002/0159282 A1 Oct. 31, 2002

(30) Foreign Application Priority Data
Apr. 27, 2001 (FR) .............................. 01 05708

(51) Int. Cl.$^7$ ............................... G05F 1/10; H02J 3/12
(52) U.S. Cl. ..................... 323/234; 320/101; 320/117
(58) Field of Search ........................... 323/234, 233, 323/222, 224; 363/124, 16, 101; 320/101, 117, 125

(56) References Cited

U.S. PATENT DOCUMENTS

| 4,801,859 | A | * | 1/1989 | Dishner ...................... 323/224 |
| 5,025,202 | A | * | 6/1991 | Ishii et al. ................... 323/906 |
| 5,138,249 | A | * | 8/1992 | Capel ......................... 323/282 |
| 5,359,280 | A | | 10/1994 | Canter et al. |
| 5,420,497 | A | | 5/1995 | Kimura et al. |
| 6,181,115 | B1 | | 1/2001 | Perol et al. |
| 6,188,199 | B1 | * | 2/2001 | Beutler et al. .............. 320/124 |
| 6,259,234 | B1 | | 7/2001 | Perol |

* cited by examiner

Primary Examiner—Rajnikant B. Patel
(74) Attorney, Agent, or Firm—Clark & Brody

(57) ABSTRACT

The present invention relates to a converter comprising at least one converter module presenting at least one electricity feed terminal coupled to an electricity generator and to an electricity feed line such as a bus and including at least one series switch and at least one parallel switch, the series switch being connected in series between the electricity feed terminal and a first inductor, itself in series with an electricity source, the first series switch and the first inductor forming a series branch, and the parallel switch being connected in parallel between said series branch and ground, said switches of said module being controlled in phase opposition by a control circuit presenting a first control state in which said switches are operated in a first or "voltage-lowering" mode of operation in which an electrical current flows from the electricity generator to the electricity feed line, and a second control state in which said switches are operated in a second or "voltage-raising" mode of operation in which the current flows from the electricity source to the electricity generator. The parallel switch is placed in a parallel branch between said electricity feed terminal and ground, and the control circuit presents a third or "shunt" mode of operation in which the parallel second switch is closed and the series switch is open.

7 Claims, 4 Drawing Sheets

ELECTRICAL POWER SUPPLY CONVERTER

The present invention relates to an electrical power supply converter coupled to a source of electricity and to an electricity feed line such as a bus.

BACKGROUND OF THE INVENTION

In the field of missions by satellites in low earth orbit (LEO), the general practice is to use a bus that is powered without regulation, as was the case in the SPOT/ERS/PPF missions and is now the case in the new PROTEUS or GLOBALSTAR mini-satellite. The reason is the high ratio between eclipse time and sun time for such missions and the resulting needs concerning the charging and discharging cycle of the battery. Coupling the battery to the bus eliminates any need for battery discharge elements, and battery charging is controlled by a shunt which presents relatively high efficiency. Such a system is shown in FIG. 1.

That solution presents drawbacks which are well known and which are particularly troublesome in certain projects such as PPF:

- the mismatch between the voltage and the array of solar sensors leads typically to the array of solar sensors being overdimensioned by at least 5% to 10%;
- the electronics must be dimensioned to operate at the lowest available battery voltage;
- the peak power that can be given by heater elements is variable;
- protection is difficult to implement; and
- the quantity of regulation that is necessary on each converter (e.g. 22 volts (V) to 37 V for the SPOT/PFF satellite), and the fact that for the filters, the size of the inductances is determined by the current at the lowest voltage while the size of the capacitors is determined by the maximum voltage on the bus.

A certain number of new projects (SKYBRIDGE, ATV) have turned towards implementing regulated buses in order to achieve their missions.

One such regulated bus is described in French patent No. 2 785 103 filed in the name of the Applicant company. That solution is not easily applicable to the case where battery voltage is higher than bus voltage as is generally the case in the ATV, SPACE BUS 3000, SOHO, XMM, INTEGRAL, etc. . . . systems. For such projects, the method used has been either a so-called "hybrid" bus or else a bus that is fully regulated with a shunt, battery charge regulation (BCR) and battery discharge regulation (BDR).

A technique that can be used with a battery voltage higher than the bus voltage is described in French patent No. FR-2 777 715 also filed in the name of the Applicant company. That concept requires the shunt to be operated sequentially. It makes it possible to achieve low losses while the shunt is in operation, but it does not make it possible to avoid implementing battery charge regulation (BCR) and it was designed more particularly for telecommunications satellites in geostationary orbit for which only a limited amount of power needs to be available for charging the battery, given that charging can be spread out over a period of 23 hours with only 1 hour of eclipse.

A conventional regulated bus architecture is shown in FIG. 2, for the case of battery voltage being greater than bus voltage.

That architecture makes use of three different converters: the shunt, the charger, and the discharger. One such design is implemented for example in SPACE BUS 3000 or in XMM/INTEGRAL. The shunt is generally a switched sequential shunt, the discharger is a voltage-lowering ("buck") type converter, the battery charger is a voltage-increasing type converter, being either a voltage-raising ("boost") type converter proper or else a voltage-lowering converter operating in push pull ("buck push pull"). As can be seen, that design needs three different converters to be implemented, each of which forms an amplifier between the main error amplifier (MEA), the bus, and/or the solar array and the battery. In addition, the charger takes its energy from the bus, i.e. energy which has been obtained after the losses generated by the shunt. Efficiency is generally high, but on a 28 V bus, for example, it may be that it does not exceed 96%.

OBJECTS AND SUMMARY OF THE INVENTION

An object of the present invention is to provide a converter enabling a bus to be regulated with a battery whose voltage is higher than that of the bus, while also simplifying the architecture.

The idea on which the invention is based is to implement an electrical module presenting only two active switches for the purpose of performing all three functions: shunt; BCR; and BDR.

U.S. Pat. No. 5,359,280 (SPACE SYSTEMS/LORAL) discloses a voltage converter for powering the bus of a satellite and which presents only two switches, one for charging and the other for discharging the battery.

The architecture of that converter does not enable the shunt function to be obtained, which function is necessary for controlling excess source energy.

Furthermore, it does not enable the converter to be segregated from the bus, e.g. by means of a protective diode. This is due to the fact that the current needs to flow in both directions from the bus.

The present invention makes it possible to obtain all of the desired shunt and battery charge and discharge functions with a module of very simple architecture coupled with a control circuit whose architecture is also simple.

The invention thus provides a converter comprising at least one converter module presenting at least one electricity feed terminal for coupling to an electricity generator such as a solar generator and to an electricity feed line such as a bus, and including at least one series switch and at least one parallel switch, the series switch being connected in series between the electricity feed terminal and a first inductor, itself connected in series with an electricity source including at least one battery, the first series switch and the first inductor forming a series branch, and the parallel switch being connected in parallel between said series branch and ground, said switches of said module being controlled in phase opposition by a control circuit presenting a first control state in which said switches are operated in a first or "voltage-lowering" mode of operation in which electrical current flows from the electricity generator to the electricity feed line, and a second control state in which said switches are operated in a second or "voltage-raising" mode of operation in which said current flows from the electricity source towards the electricity generator, wherein the parallel switch is connected in a parallel branch between said electricity feed terminal and ground, and wherein the control circuit presents a third or "shunt" control state in which the parallel second switch is closed and the series switch is open.

In a preferred embodiment, the control circuit presents a first amplifier (for example common to a plurality of modules) which compares the voltage of the feed line with a reference voltage, and whose output is applied to an input of a second amplifier whose other input receives a signal representative of current output from the module in the electricity feed line. This serves to control the charging and discharging modes of the electricity generator.

In the converter, the control circuit presents a third amplifier whose output induces said third mode of operation when a charging current delivered by the module in the second control state exceeds a given threshold. The choice of this condition is particularly advantageous because providing there is enough electricity available for charging the battery, then the electricity demand of the bus is also satisfied, which means there is no need to impose other conditions on operation in shunt mode.

In the converter, at least one converter module presents a plurality of electricity feed terminals, and for each of said electricity feed terminals there is a series switch forming a series branch together with said first inductor between said terminal and the battery, and a parallel switch forming a parallel branch between said terminal and ground.

In a particular embodiment, the parallel switch(es) is/are connected in series with a second inductor. A capacitor whose terminals are connected between a terminal of the first inductor not connected to the electricity generator, and a terminal of the second inductor not connected to ground.

Advantageously, the converter presents a protective diode which makes it possible to segregate the bus from the converter. This makes it possible to charge the battery in parallel without having a charger converter connected to the bus. In addition, in the event of a module failing, the capacity of the bus is not short-circuited.

BRIEF DESCRIPTION OF THE DRAWINGS

Other characteristics and advantages of the invention will appear more clearly on reading the following description, given by way of non-limiting example and with reference to the accompanying drawings, in which.

MORE DETAILED DESCRIPTION

Figure 1:
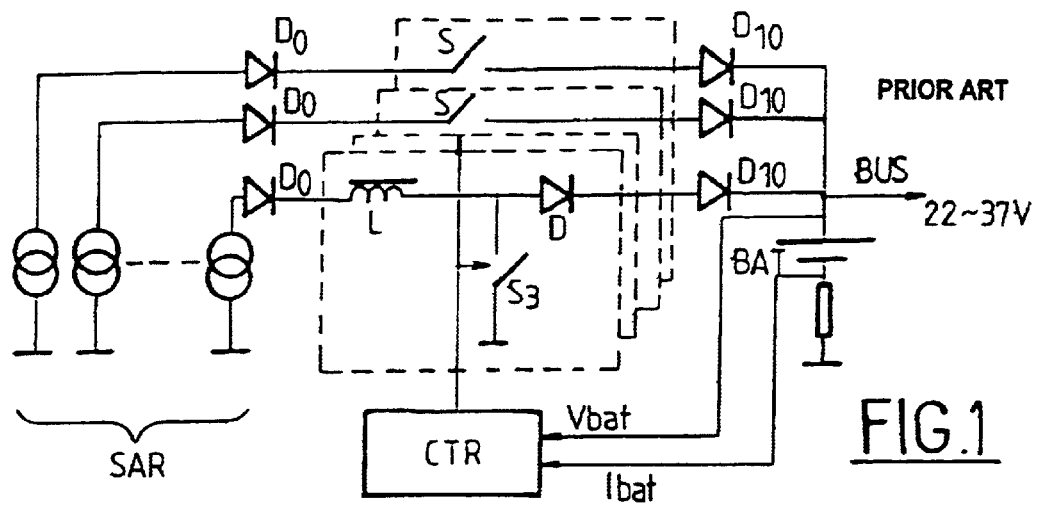
FIG. 1 is a diagram of a non-regulated bus of the prior art.

FIG. 1 shows a simple architecture for a non-regulated bus in which a control circuit CTR responsive to the voltage Vbat and the current Ibat of a battery BAT to close a series switch S coupled to a solar collector element in an array of solar collectors SAR, or to close a parallel switch S3 which acts as a shunt. The bus BUS is thus powered either by the battery BAT or simultaneously by both the battery BAT and the solar collectors of the array SAR.

Figure 2:
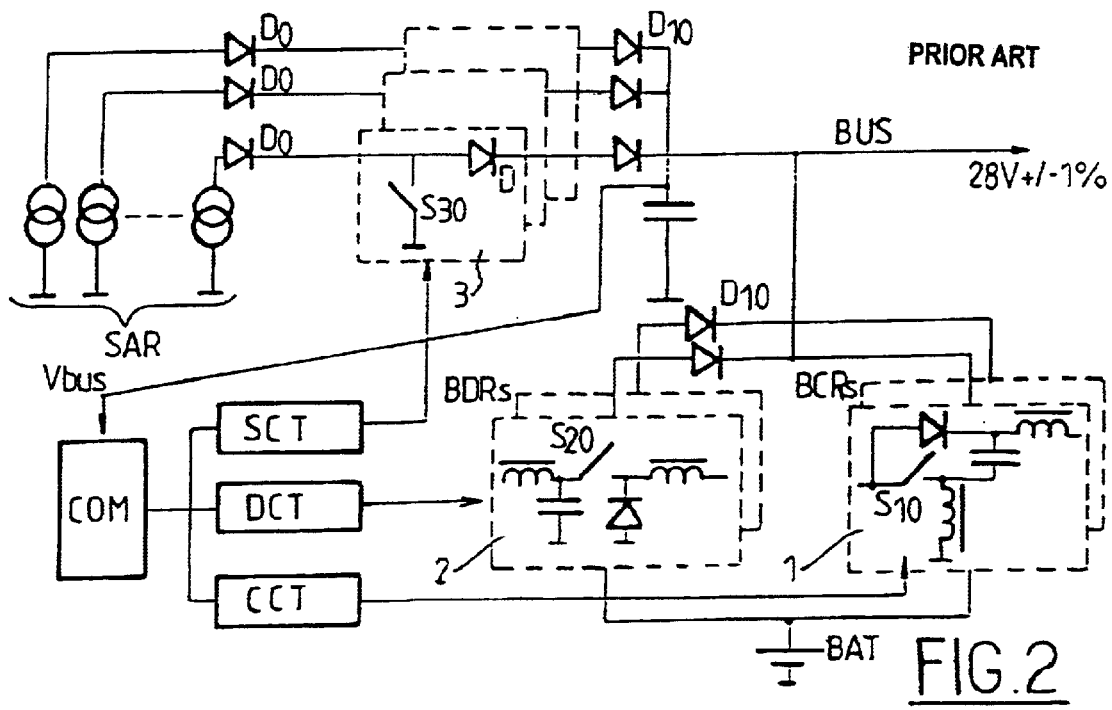
FIG. 2 shows a conventional architecture for a regulated bus.

FIG. 2 shows a conventional regulated bus architecture implementing three converters referenced as follows: 1 for battery charging; 2 for battery discharging; and 3 for the shunt. A control circuit COM driven by the voltage Vbus of the bus BUS drives control circuits CCT to the module 1, DCT to the module 2, and SCT to the module 3. As shown by the architecture, the battery BAT charges by taking energy from the bus, i.e. energy which has been acquired after passing through the shunt module 3, with the losses that that entails.

Figure 3:
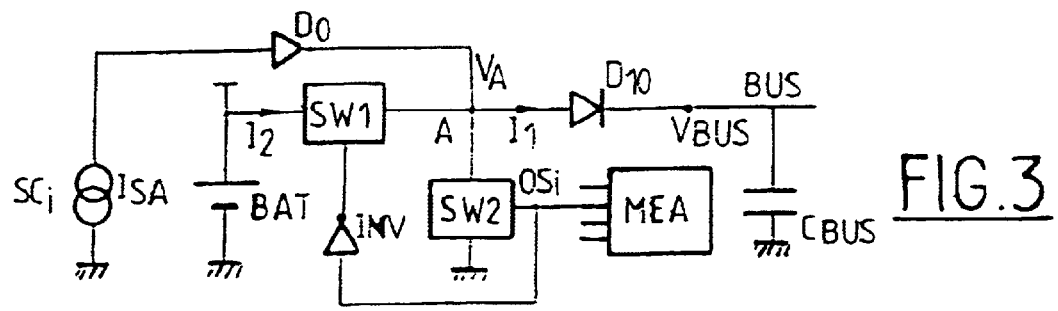
FIG. 3 shows a simplified architecture for a converter of the invention, where only the effect of the switches is shown.

FIG. 3 shows the topography of a module MODi. It comprises a solar collector section SCi supplying current ISA which is coupled to a point A of voltage VA via a diode DO. The module feeds current I1 to a bus BUS in parallel with the other modules. An energy storage element BAT supplies or takes current I2. A serial switch SW1 is in series between the battery BAT and the point A. A parallel switch SW2 is placed between the point A and ground. These switches are controlled in phase opposition by a signal OSi supplied by a control circuit MEA.

The architecture of the module MODi is extremely simple since it implements only two switches SW1 and SW2 for performing all of the desired battery charging, battery discharging, and shunt functions.

The n modules MOD1, MOD2, ..., MODn-1, and MODn are controlled by the control circuit MEA.

Figure 4A:
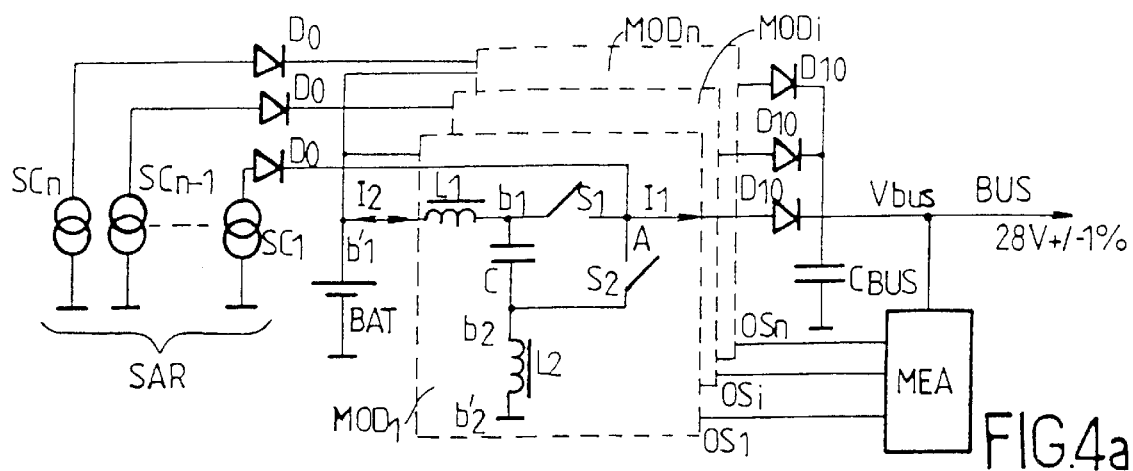
FIG. 4a shows a preferred embodiment of a converter module of the invention, whose control circuit is itself shown in FIG. 4b; in this example, a so-called "superbuck" topology is used while discharging the battery, and a "boost" topology is used while charging, but naturally other topologies are not excluded.
Figure 4B:
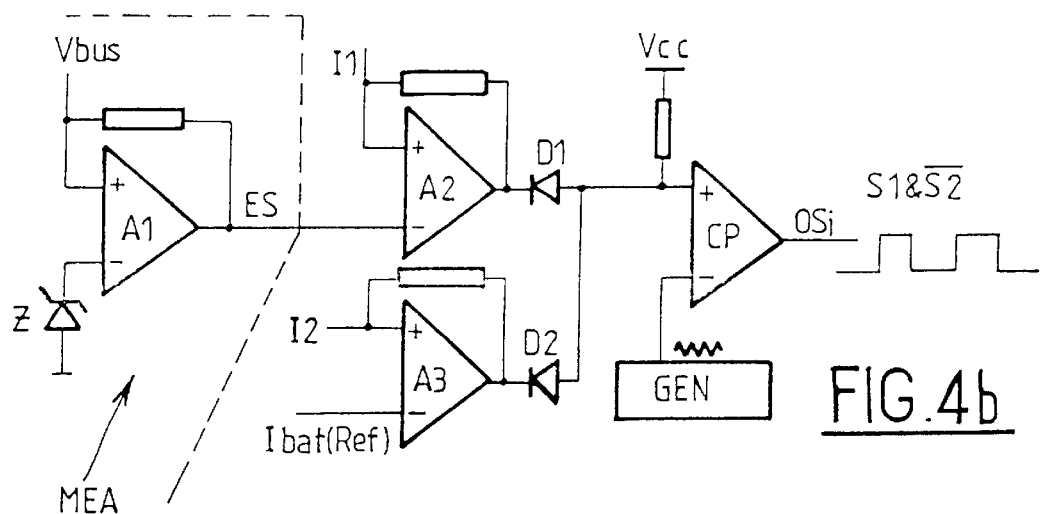

In the preferred embodiment of FIG. 4a, each module is associated with a respective solar collector module SC1, SC2, ..., SCn-1, and SCn. For each module, the output current it delivers through a separator diode D10 to the bus BUS is written I1 and its positive or negative contribution to the energy storage element BAT comprising at least one battery is written I2. Each module MOD1, ..., MODn has a series inductance L1 with one of its terminals b'1 connected to the storage element BAT and with its other terminal b1 connected to one of the terminals of the switch S1 whose other terminal is connected to the point A of the module which is powered by a solar collector SC1, ..., SCn and from which the current I1 is delivered to the bus BUS. The switch S2 is placed between the terminal A and one of the terminals b2 of a second inductor L2 whose other terminal b'2 is grounded. Finally, a capacitor C is connected between the terminals b1 and b2. The module MOD1 is controlled by the control circuit MEA as shown in FIG. 4b. The philosophy of this circuit is to activate the shunt whenever the charging current I2 supplied by the module reaches a reference value corresponding to satisfactory charging of the battery element BAT by the module. As a result, all of the modules and the shunts are not controlled sequentially but instead they are controlled in parallel as a function of the current demand of the energy storage element BAT. Nevertheless, it is possible to use the shunts in sequential mode as a function of the total current going to the battery.

The advantage of this mode of control is that providing the current demand of the storage unit BAT is satisfied, then the current supplied to the bus is also sufficient.

The mode of operation is described more fully below with reference to FIG. 4b.

A first operational amplifier A1 receives the voltage Vbus from the bus and compares it with a reference voltage supplied by a zener diode Z. This comparator A1 thus determines whether the voltage on the bus is or is not sufficient, and it generates a corresponding error signal ES which is either positive or negative. This error signal ES serves as a current reference for the current input to the battery charger. For this purpose, a second operational amplifier A2 receives the error signal ES together with a signal representing the current I1 supplied by the module MODi. The output from the amplifier A2 feeds a control comparator CP via a diode D1 and the comparator in turn supplies an output signal OSi which is a squarewave signal whose duty ratio is variable. For this purpose, a triangular signal generator GEN has its output connected to one input of the control circuit CP whose other input is coupled to the output of the comparator A2 via the diode D1. The triangular signal generator determines the switching frequency of the converter.

The shunt function is provided by the comparator or the amplifier A3 which thus compares, as mentioned above, the current I2 with the reference current for the element BAT, and whose output is coupled to the circuit CP through the diode D2. There is only one circuit A1 for all of the modules (bus voltage loop), and each module presents its own amplifiers or comparators A2 and A3.

A3 can be a comparator (sequential or "bang—bang" mode) or it can be an amplifier (regulation mode).

Operation is then as follows:

Consider the case of a satellite in low earth orbit (LEO). Consider initially the case of the array of solar collectors SAR being illuminated so as to generate enough power to produce a satisfactory bus voltage Vbus. There even exists excess current (generally 30% to 40%) for charging the storage unit BAT. Given that the power available is greater than the needs of the bus, the output of the comparator amplifier A1 drifts positively and the error signal output ES serves as a current reference for the input current that is to charge the battery BAT. In other words, the higher the voltage of the bus, the more current is available for charging the storage element BAT. The FIG. 4a module with the switches S1 and S2, the two inductors L1 and L2, and the capacitor C is of a topology that makes both-way operation possible. Between the bus (point A) and the storage unit BAT, the module operates as a booster, the switch S2 being active and the switch S1 serving as a synchronous rectifier. It can also act from the storage unit BAT to the bus to lower voltage, the switch S1 being active and the switch S2 serving as a synchronous rectifier. This operation is not fundamentally different from that described in above-cited U.S. Pat. No. 5,359,280, which also performs such both-way functions.

In the above-specified circumstances where the collectors of the array SAR are exposed to solar radiation, boost mode is operational until the point where the charging current reference changes or becomes zero because the battery is charged. Until this point, it is only the first regulation loop that is operational (via the amplifier A2), the diode D1 controlling the voltage at the input of the comparator CP.

When the available solar energy is such that not only is the required voltage obtained on the bus, but also the maximum charging current for the storage element BAT is obtained, then the amount of power available is in excess. It is then necessary to enter into the shunt domain as in a conventional bus having three regulation domains.

With the new architecture, instead of controlling this shunt function from the bus voltage (see for example FIG. 2), the shunt is activated by regulating the current on the storage element BAT. The second regulation loop (amplifier or comparator A3) then comes into action, and it is now the diode D2 which controls the operation of the comparator CP to regulate the conduction time of the switch S2 in shunt mode, in alternation with the diode D1 (battery charging or discharging mode). In other words, these two loops are active sequentially in order to control the bus BUS, and the modules operate in parallel.

In shunt mode, the switch S2 is closed when both the voltage Vbus on the bus and the maximum charging current for the battery BAT are achieved simultaneously. This is possible because of the cause-and-effect relationship that exists between these two effects. Battery charging current I2 can exist only if the desired bus voltage Vbus has already been achieved. If the charging current for the battery BAT reaches the maximum permitted level, the voltage Vbus on the bus continues to be achieved specifically because there is current available for charging the storage unit BAT.

In shunt mode, the switch S2 is closed continuously, should that be necessary. It is under pulse control, so that the switch S2 can be kept closed indefinitely. The switching frequency depends on the operating point of the shunt. In practice, it is one-tenth to one-hundredth of the switching frequency of the converter. This depends on the selected mode of operation: the shunt can operate in sequential mode or else all of the modules operating in shunt mode are in parallel. The way S2 is controlled tends to create a mean voltage at the solar panel (prior to the segregation diode) which satisfies the mean power demanded by the battery and by the bus.

When the satellite is in eclipse mode, the voltage on the bus can be satisfied only if the storage unit BAT supplies the electricity that is demanded. The polarity of the error voltage ES output by the comparator A1 then depends on a reference current of opposite polarity on the bus, i.e. a current flowing from the storage unit BAT. In this mode of operation, the amplifier A2 provides a voltage at the input of the comparator CP such that given the duty ratio of the signal OSi, the switch S1 is active and the comparator S2 acts as a synchronous rectifier. It is recalled that the switches S1 and S2 are always switched in opposition, which means that only one control needs to be used (e.g. having complementary outputs) in order to control both switches S1 and S2.

The reason the converter can operate in battery charging mode while satisfying simultaneously the conditions required for bus operation and for supplying current to the storage unit BAT, while being powered by a constant current source (the solar array SAR) is that there exists a degree of freedom in the system, which degree of freedom is the mean voltage delivered by the solar array SAR. It is found that because of the boost operation of the converter, this voltage adjusts itself to a value such that the product of the mean voltage multiplied by the mean current (practically constant) supplied by the array SAR corresponds to a mean power equal to the bus power plus the power required for charging the storage unit BAT, the storage unit BAT being seen at any given instant as a fixed voltage. In shunt mode, S2 is controlled in such a way that the duty ratio of the control signal applied to S2 gives the necessary mean voltage at the solar panel.

In this newly-proposed concept, the shunt is not necessarily sequential, and all of the modules can operate in parallel. This has a favorable impact on the frequency at the amplitude of voltage variation on the capacitor Cbus. The shunt can then operate at a higher frequency.

Nevertheless, sequential shunt mode operation is also possible and leads to an operating frequency that is lower.

Figure 5:
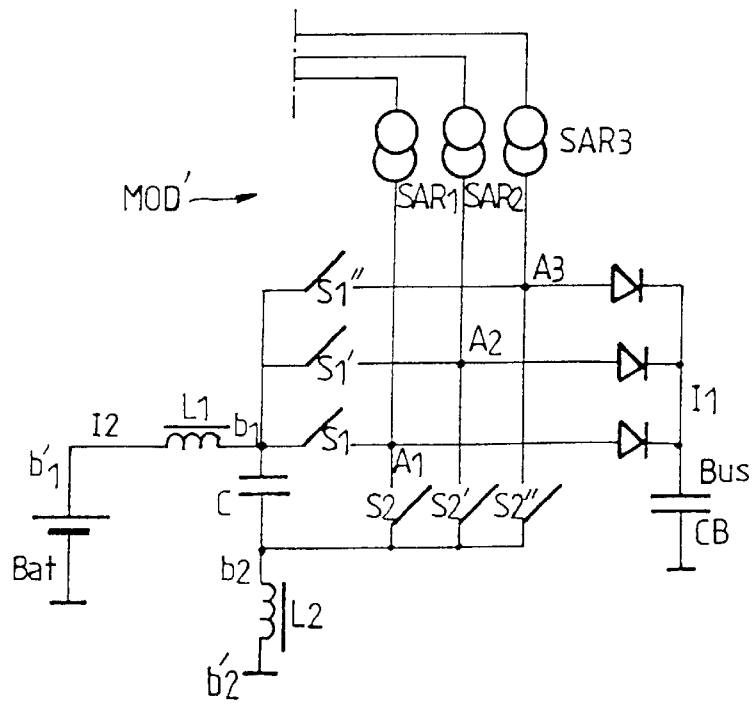
FIG. 5 shows a converter module of the invention powered by a plurality of solar collector sections.

As shown in FIG. 5, is it possible to associate a plurality of solar collector sections with a single module. In the example of FIG. 5, three solar collector sections SAR1, SAR2, and SAR3 are coupled to terminals A1, A2, and A3. There are thus three pairs of switches S1 & S2, S1' & S2', and S1" & S2", respectively. S1 is connected between the terminals b1 and A1, S1' between the terminals b1 and A2, and S1" between the terminals b1 and A3. S2 is connected the terminals A1 and b2, S2' between the terminals A2 and b2, and S2" between the terminals A3 and b2. The module has the same inductors L1 and L2 and capacitor C as before.

Figure 6:
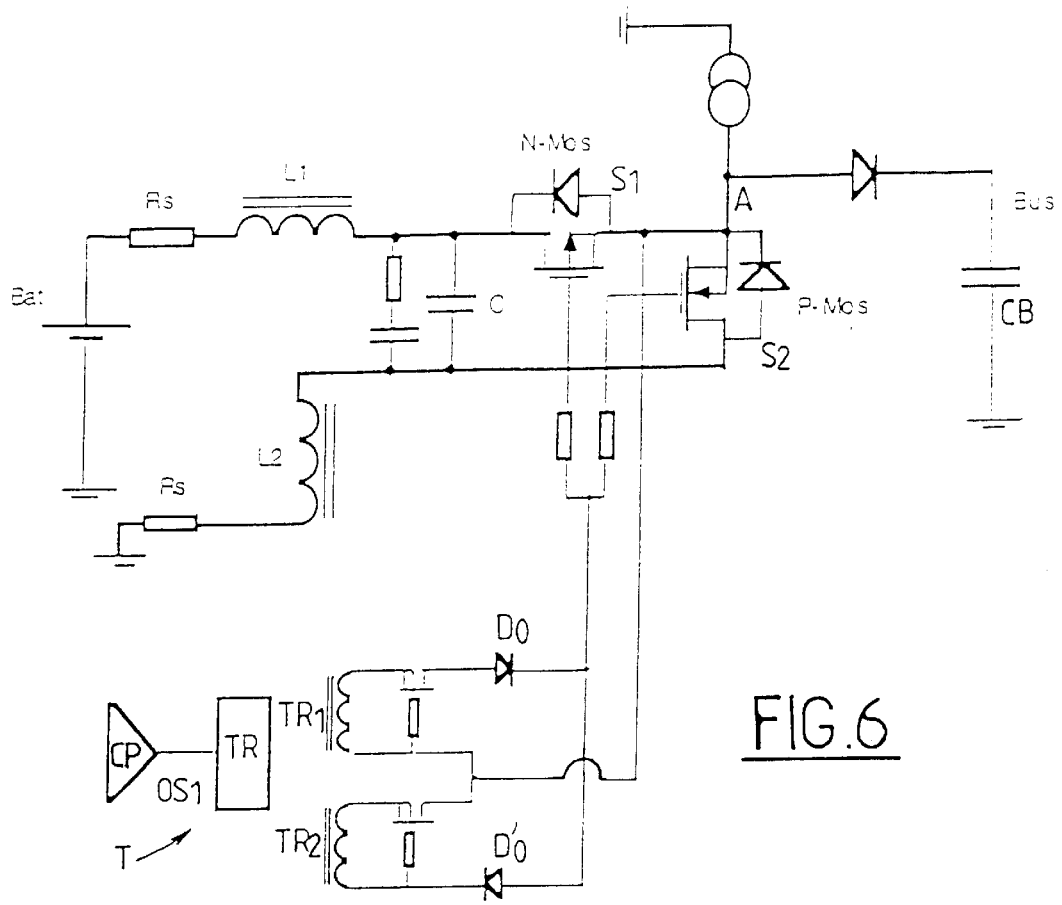
FIG. 6 shows a preferred topology for implementing the invention.

FIG. 6 shows a preferred embodiment for controlling a module in which the control circuit CP supplies its signal OS1 to the primary winding TR of a transformer T whose secondary windings TR1 and TR2 have a midpoint coupled to the point A and whose secondary windings are coupled via diodes D0 and D'0 to the gates of respective NMOS and PMOS transistors constituting the switches S1 and S2, thus enabling switching to take place in opposition on the basis of a single output signal.

Figure 7:
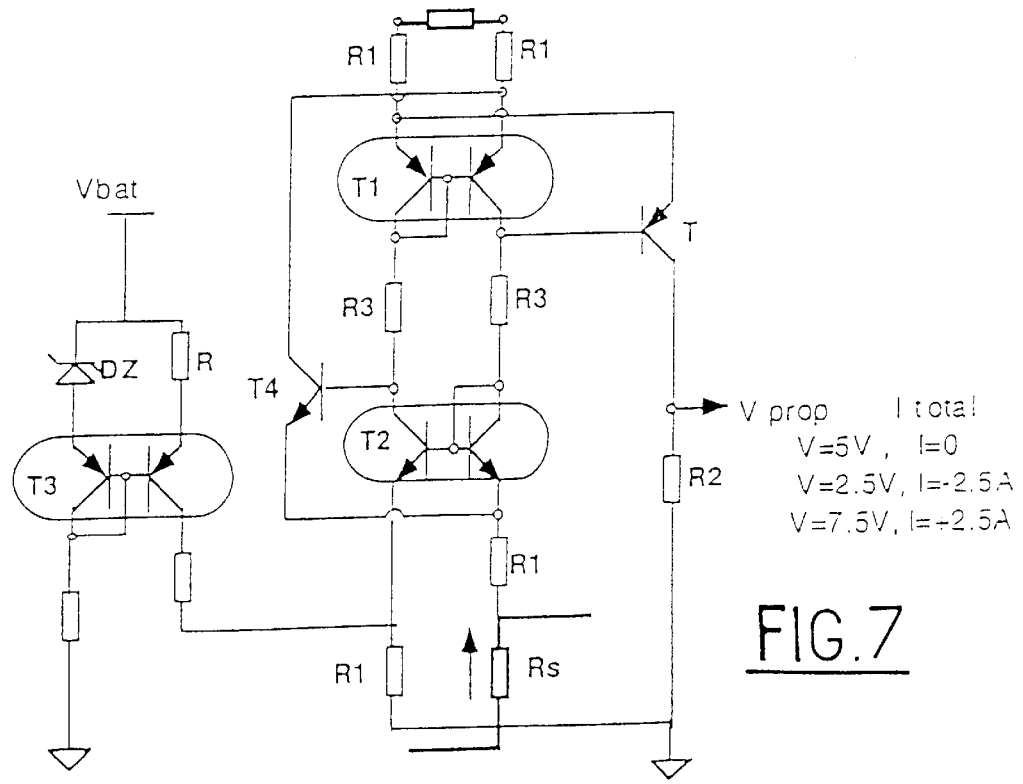
FIG. 7 shows how both-way current is detected in a preferred embodiment of the invention.

Finally, FIG. 7 shows a current mirror configuration enabling the current I1 to be detected in both directions. It should be observed that an alternative solution could be achieved using a Hall effect sensor.

The timing diagram for the frequency and the waveform of the voltage VA at point A in shunt mode can vary as a function of the mode of operation of the amplifier A3, i.e. depending on whether A3 is operating as a comparator (so-called "bang—bang" mode) or as an amplifier (sequential or regulated mode), and whether all of the modules are operating in shunt mode in parallel, or whether they are operating sequentially.

Figure 8A:
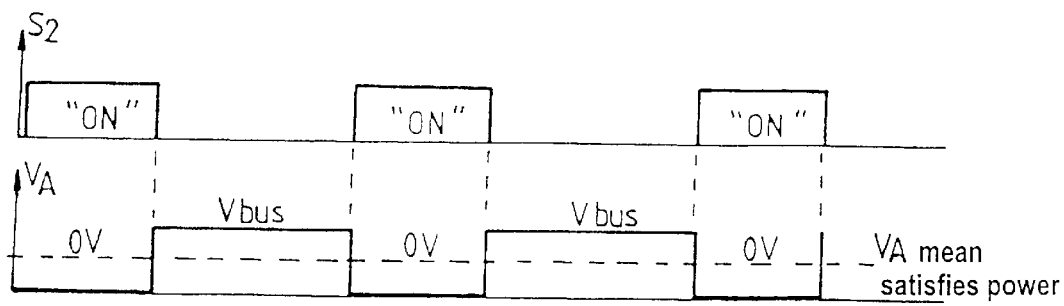
FIGS. 8a, 8b, 9, and 10a to 10c are signal timing diagrams.
Figure 8B:
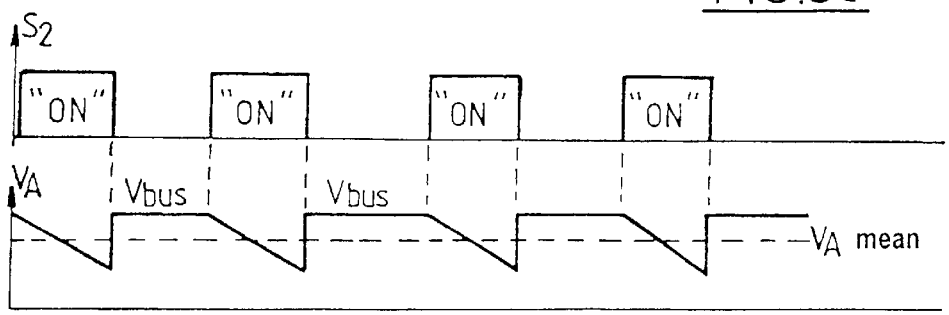

FIGS. 8a and 8b show the voltage VA for the switch S2 respectively in bang—bang mode operation and in regulated mode operation.

Figure 9:
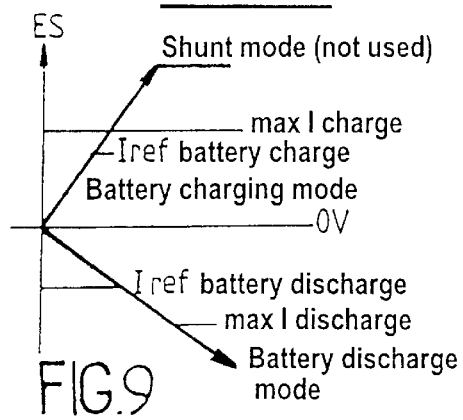

FIG. 9 shows the values of the voltage ES at the output A1 in various different modes. In shunt mode, the voltage ES is not used.

Figure 10B:
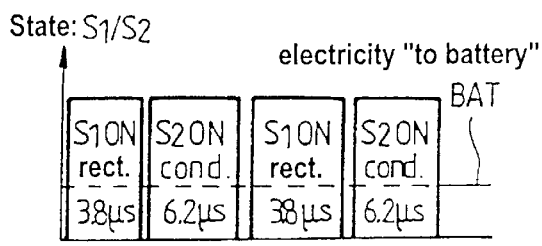
Figure 10A:
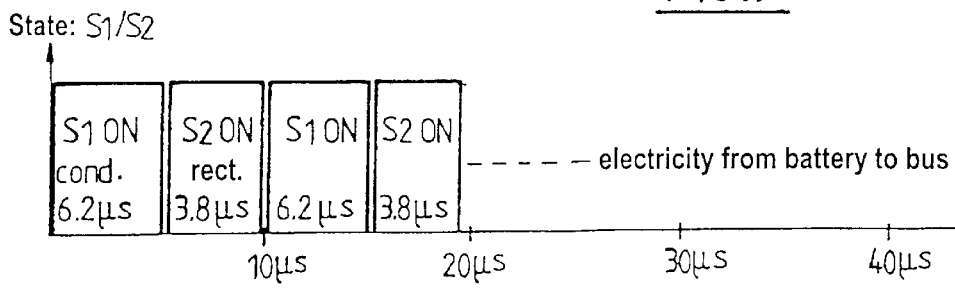
Figure 10C:

FIGS. 10a to 10c show the switching of the switches S1/S2 respectively:

in battery discharge mode (e.g. Vbus=28 V; Vbat=45 V); S1 (ON)=6.3 microseconds (us); S2 (ON)=3.8 µs;

in battery charging mode S1 (ON)=3.8 µs; S2 (ON)=6.2 µs; and in shunt mode with "ON" marking which switch is closed (S1 or S2).

What is claimed is:

1. A converter comprising at least one converter module presenting at least one electricity feed terminal for coupling to an electricity generator such as a solar generator and to an electricity feed line such as a bus, and including at least one series switch and at least one parallel switch, the series switch being connected in series between the electricity feed terminal and a first inductor, itself connected in series with an electricity source including at least one battery, the first series switch and the first inductor forming a series branch, and the parallel switch being connected in parallel between said series branch and ground, said switches of said module being controlled in phase opposition by a control circuit presenting a first control state in which said switches are operated in a first or "voltage-lowering" mode of operation in which electrical current flows from the electricity generator to the electricity feed line, and a second control state in which said switches are operated in a second or "voltage-raising" mode of operation in which said current flows from the electricity source towards the electricity generator, wherein the parallel switch is connected in a parallel branch between said electricity feed terminal and ground, and wherein the control circuit presents a third or "shunt" control state in which the parallel second switch is closed and the series switch is open.

2. A converter according to claim 1, wherein the control circuit presents a first amplifier which compares the voltage of the feed line with a reference voltage, and whose output is applied to an input of a second amplifier whose other input receives a signal representative of current output from the module in the electricity feed line.

3. A converter according to claim 1, wherein the first amplifier is common to a plurality of modules.

4. A converter according to claim 1, wherein the control circuit presents a third amplifier whose output induces said third mode of operation when a charging current delivered by the module in the second control state exceeds a given threshold.

5. A converter according to claim 1, wherein at least one converter module presents a plurality of electricity feed terminals, and wherein for each of said electricity feed terminals it has a series switch forming a series branch together with said first inductor between said terminal and the battery, and a parallel switch forming a parallel branch between said terminal and ground.

6. A converter according to claim 1, wherein the parallel switch(es) is/are connected in series with a second inductor, and wherein the converter presents a capacitor whose terminals are connected between a terminal of the first inductor not connected to the electricity generator, and a terminal of the second inductor not connected to ground.

7. A converter according to claim 1, including a protective diode enabling the converter to be segregated from the bus.

* * * * *